(12) United States Patent
Zhang et al.

(10) Patent No.: US 10,555,849 B2
(45) Date of Patent: Feb. 11, 2020

(54) OMNIDIRECTIONAL ELECTRIC HEALTHCARE BEDCHAIR

(71) Applicant: Jiangnan University, Wuxi (CN)

(72) Inventors: Hong Zhang, Wuxi (CN); Shuang Lu, Wuxi (CN)

(73) Assignee: JIANGNAN UNIVERSITY, Wuxi, Jiangsu (CN)

(*) Notice: Subject to any disclaimer, the term of this patent is extended or adjusted under 35 U.S.C. 154(b) by 26 days.

(21) Appl. No.: 15/736,589

(22) PCT Filed: Dec. 23, 2015

(86) PCT No.: PCT/CN2015/098376
§ 371 (c)(1),
(2) Date: Dec. 14, 2017

(87) PCT Pub. No.: WO2017/020495
PCT Pub. Date: Feb. 9, 2017

(65) Prior Publication Data
US 2018/0185218 A1 Jul. 5, 2018

(30) Foreign Application Priority Data
Aug. 6, 2015 (CN) .......................... 2015 1 0476887

(51) Int. Cl.
*A61G 5/04* (2013.01)
*A61G 5/08* (2006.01)
(Continued)

(52) U.S. Cl.
CPC ............. *A61G 7/001* (2013.01); *A61G 5/006* (2013.01); *A61G 5/04* (2013.01); *A61G 5/10* (2013.01);
(Continued)

(58) Field of Classification Search
CPC .......... A61G 5/04; A61G 5/041; A61G 5/042; A61G 5/043; A61G 5/044; A61G 5/045;
(Continued)

(56) References Cited

U.S. PATENT DOCUMENTS 2,902,696 A * 9/1959 Mittell ....................... A61F 4/00
623/24
4,926,952 A * 5/1990 Famam .................. A61G 5/046
180/251
(Continued)

FOREIGN PATENT DOCUMENTS

CN 203790097 * 4/2014
WO 2015/057076 * 4/2015

*Primary Examiner* — Anne Marie M Boehler
(74) *Attorney, Agent, or Firm* — IPro, PLLC; Na Xu

(57) ABSTRACT

Disclosed is an omni-directional electric medical care bed chair, including mecanum wheels, rollover prevention wheels, a bottom support, motors, a controller, a push rod device, a bed chair device, a cervical traction device, a shoulder joint rehabilitation device and ankle joint rehabilitation devices, wherein the push rod device drives the bed chair device to move, and therefore mutual switching among states of sitting, lying and turning over of the bed chair device can be realized. In conjunction with a bed chair technology enabling lying and turning over, a mecanum wheel technology and medical care rehabilitation equipment, the medical care bed chair has functions of sitting, lying and turning over, also has an omni-directional movement ability, and can assist a patient in body rehabilitation training.

6 Claims, 5 Drawing Sheets

(51) Int. Cl.
*A61G 7/16* (2006.01)
*A63B 23/08* (2006.01)
*A63B 23/12* (2006.01)
*A61G 7/00* (2006.01)
*A61G 7/015* (2006.01)
*A61G 7/057* (2006.01)
*A61G 5/10* (2006.01)
*A61G 5/00* (2006.01)
*B60B 19/00* (2006.01)

(52) U.S. Cl.
CPC .............. *A61G 5/104* (2013.01); *A61G 7/015* (2013.01); *A61G 7/057* (2013.01); *B60B 19/003* (2013.01); *B60B 2200/26* (2013.01)

(58) Field of Classification Search
CPC ........ A61G 5/046; A61G 7/001; A61G 7/008; A61G 7/015; A61G 7/16; B60B 19/003; B60B 19/125; B60B 19/12; B60B 2200/26
See application file for complete search history.

(56) References Cited

U.S. PATENT DOCUMENTS

| | | | | |
|---|---|---|---|---|
| 4,949,408 A | * | 8/1990 | Trkla | A61G 5/006 |
| | | | | 297/DIG. 4 |
| 6,585,669 B2 | * | 7/2003 | Manor | A61H 1/0266 |
| | | | | 128/898 |
| 9,014,872 B2 | * | 4/2015 | Hsu | G01C 21/206 |
| | | | | 701/1 |
| 9,027,678 B1 | * | 5/2015 | Morris | A61G 5/04 |
| | | | | 180/22 |
| 9,198,813 B2 | * | 12/2015 | Hsu | A61G 5/046 |
| 9,999,557 B2 | * | 6/2018 | Diaz-Flores | A61G 5/023 |
| 2014/0339391 A1 | * | 11/2014 | Hsu | A61G 5/046 |
| | | | | 248/371 |
| 2015/0014959 A1 | * | 1/2015 | Youngmann | A61G 5/006 |
| | | | | 280/400 |
| 2015/0202103 A1 | * | 7/2015 | Olst | A61G 5/04 |
| | | | | 297/423.32 |
| 2016/0101664 A1 | * | 4/2016 | Richter | B60G 99/002 |
| | | | | 701/49 |

* cited by examiner

OMNIDIRECTIONAL ELECTRIC HEALTHCARE BEDCHAIR

TECHNICAL FIELD

The present invention relates to an omni-directional electric medical care bed chair enabling lying and turning over and having a rehabilitation function.

BACKGROUND

Manual wheelchairs are sold on the current market mostly, and a small number of electric wheelchairs and bed chairs are sold at the same time. Disclosed in Patent No. 201210060892.5 is an omni-directional electric wheelchair. With adoption of mecanum wheels, the wheelchair is stronger in flexibility, but does not have functions of lying and turning over. Disclosed in Patent No. 201310074374.3 is a multi-functional rehabilitation care wheelchair bed, which is mainly characterized in that a lying wheelchair and a turning-over bed are combined so that the wheelchair and the bed can be conveniently connected and disconnected to achieve functions of lying and turning over; however, the structure is slightly complicated, and due to adoption of common wheels, the flexibility is poor. In conjunction with a bed chair technology enabling lying and turning over, a mecanum wheel technology and medical care rehabilitation equipment, the medical care bed chair of the present invention has functions of sitting, lying and turning over, also has an omni-directional movement ability, and can assist a patient in body rehabilitation training.

SUMMARY

An objective of the present invention is to provide a medical care bed chair which has functions of lying and turning over, is flexible and convenient and can assist a patient in body rehabilitation training by utilizing an existing bed chair technology in conjunction with a mecanum wheel technology and medical care rehabilitation equipment.

The present invention adopts the following technical schemes:

an omni-directional electric medical care bed chair includes mecanum wheels, rollover prevention wheels, a bottom support, motors, a controller, a push rod device, a bed chair device, a cervical traction device, a shoulder joint rehabilitation device and ankle joint rehabilitation devices.

Further, the bed chair device includes backrest telescopic rods, backrest surfaces, a backrest connecting rod, armrests, armrest supporting rods, a handle, a seat surface connecting piece, seat surfaces, a seat surface connecting rod, leg surfaces, a leg connecting rod and extrusion locks, wherein the backrest telescopic rods comprise a backrest telescopic rod a and a backrest telescopic rod b, and are hinged to each other, one side of each rod being provided with a convex strip which can be matched with a concave groove in the backrest surfaces and being mounted on the concave groove; the backrest surfaces comprise a backrest surface a and a backrest surface b, are distributed on two sides of the backrest connecting rod and are hinged to the backrest connecting rod hinged to the bottom support separately, the concave grooves are provided in the backrest surfaces, and a pair of extrusion locks is hinged to the two backrest surfaces separately; there are two armrests and two armrest supporting rods, which are distributed on two sides of the bed chair, the armrests are hinged to the backrest surfaces, and two ends of the armrest supporting rods are hinged to the corresponding armrests and seat surfaces respectively; the handle is mounted at the front end of one armrest, and the handle is connected to the controller; the seat surfaces comprise a seat surface a and a seat surface b, and are hinged to the seat surface connecting rod mounted on the seat surface connecting piece, respectively, the seat surface connecting piece being mounted on the bottom support; the leg surfaces comprise a leg surface a and a leg surface b, are distributed on two sides of the leg connecting rod and are hinged to the leg connecting rod hinged to the bottom support, respectively, concave grooves are provided in the leg surfaces, and a pair of extrusion locks is hinged to the two leg surfaces separately; and the seat surface a and the seat surface b are hinged to the backrest surface a and the backrest surface b respectively, and the seat surface a and the seat surface b are hinged to the leg surface a and the leg surface b respectively.

Further, the push rod device includes a backrest push rod connecting piece, a backrest push rod, a seat surface push rod connecting piece, a seat surface push rod, a leg push rod and a leg push rod connecting piece, wherein two ends of the backrest push rod are hinged to the bottom support and the backrest push rod connecting piece mounted on the backrest connecting rod, respectively, and the backrest connecting rod is hinged to the bottom support; two ends of the seat surface push rod are hinged to the bottom support and the seat surface push rod connecting piece mounted on the seat surface, respectively; and two ends of the leg push rod are hinged to the bottom support and the leg push rod connecting piece mounted on the leg connecting rod respectively, and the leg connecting rod is hinged to the bottom support.

Further, two mecanum wheels and motors corresponding to the mecanum wheels are mounted on two sides below the bottom support, respectively, the controller is mounted in the middle of the bottom support, and the motors are connected to the controller; and two rollover prevention wheels are mounted below the rear side of the bottom support.

Further, the cervical traction device is mounted on the backrest connecting rod, is used for traction rehabilitation training on the neck of a patient, and is detachable.

Further, the shoulder joint rehabilitation device is mounted at the upper part of the rear side of the bottom support, is used for rehabilitation training on the shoulder joint of the patient, and can be selectively mounted on a corresponding side as required, and is detachable.

Further, one side of a rod-like part of each of a pair of ankle joint rehabilitation devices is provided with a convex strip which can be matched with one concave groove in the leg surfaces and is mounted on the concave groove by means of the corresponding eccentric extrusion lock, and the ankle joint rehabilitation devices are used for rehabilitation training on the ankle joints of the patient, and are adjustable in height.

Figure 1:
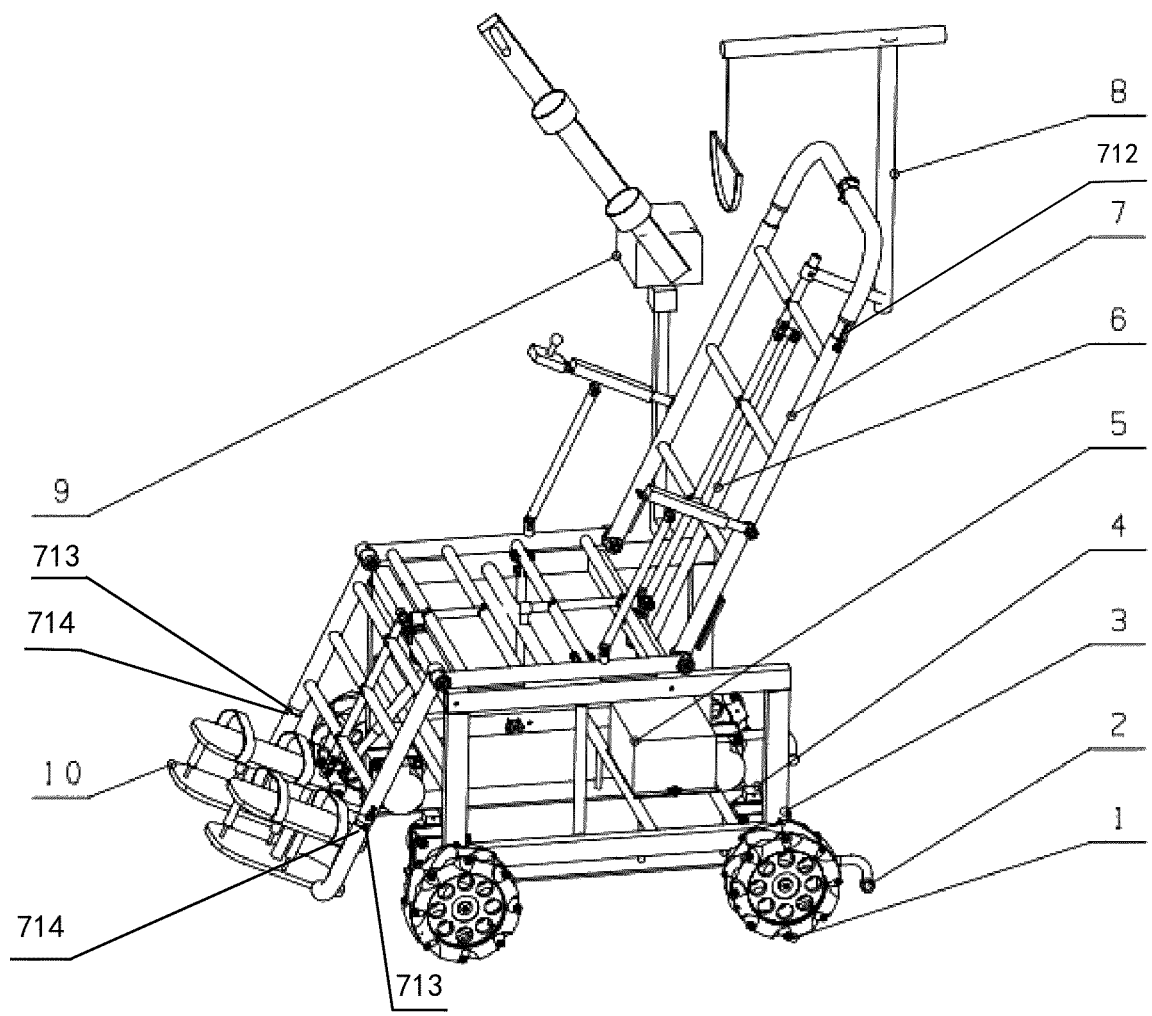
FIG. 1 is an overall structure schematic diagram of the present invention.

Components and drawing marks: mecanum wheel (1); rollover prevention wheel (2); bottom support (3); motor (4); controller (5); push rod device (6); bed chair device (7); cervical traction device (8); shoulder joint rehabilitation device (9); ankle joint rehabilitation device (10); backrest push rod connecting piece (601); backrest push rod (602); seat surface push rod connecting piece (603); seat surface push rod (604); leg push rod (605); leg push rod connecting piece (606); backrest telescopic rod (701); backrest surface (702); backrest connecting rod (703); armrest (704); armrest supporting rod (705); handle (706); seat surface connecting piece (707); seat surface (708); seat surface connecting rod (709); leg surface (710); leg connecting rod (711); extrusion lock (712); concave groove (713); convex strip (714).

DETAILED DESCRIPTION

Figure 2A:
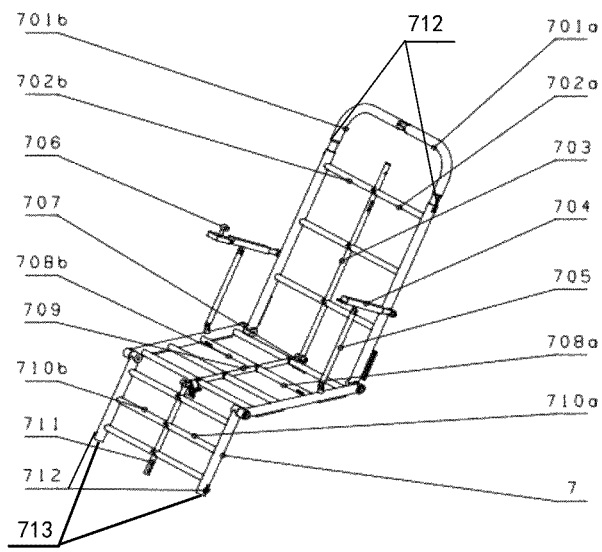
FIG. 2a is a structure schematic diagram of a bed chair device of the present invention in a state of sitting.
Figure 2B:
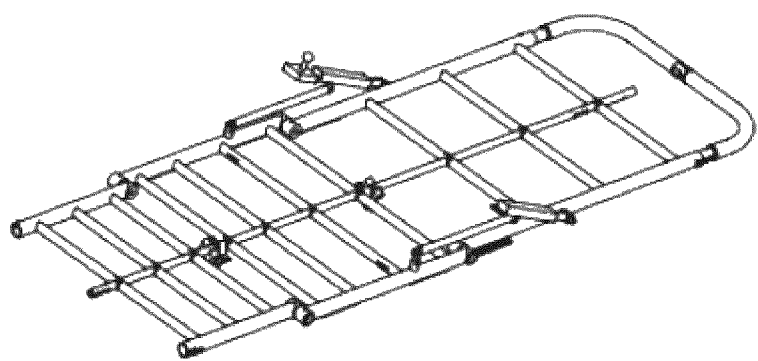
FIG. 2b is a structure schematic diagram of the bed chair device of the present invention in a state of lying.
Figure 2C:
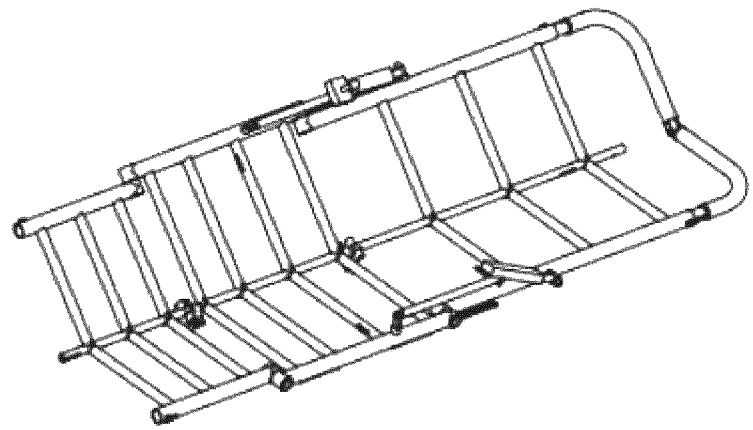
FIG. 2c is a structure schematic diagram of the bed chair device of the present invention in a state of turning over.
Figure 3:
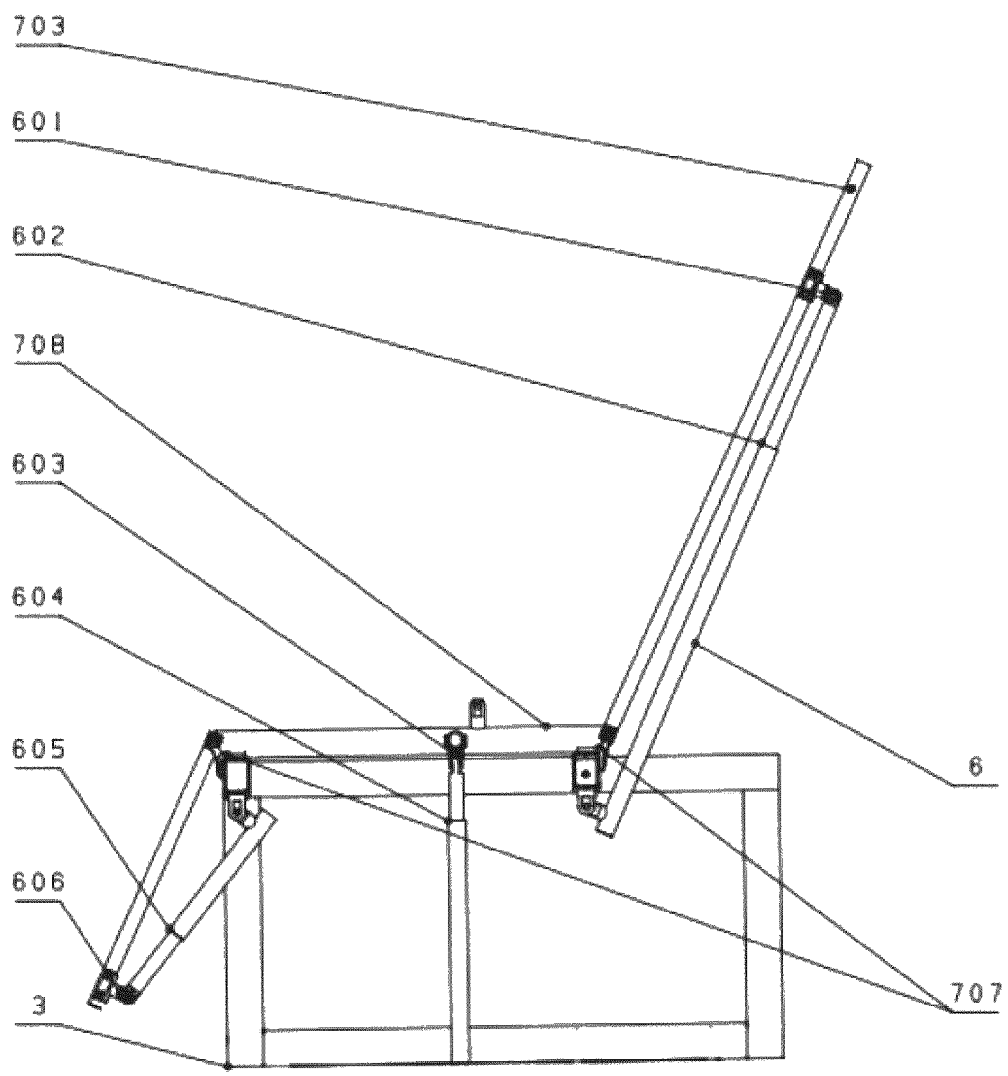
FIG. 3 is a mounting schematic diagram of a push rod device of the present invention.
Figure 4:
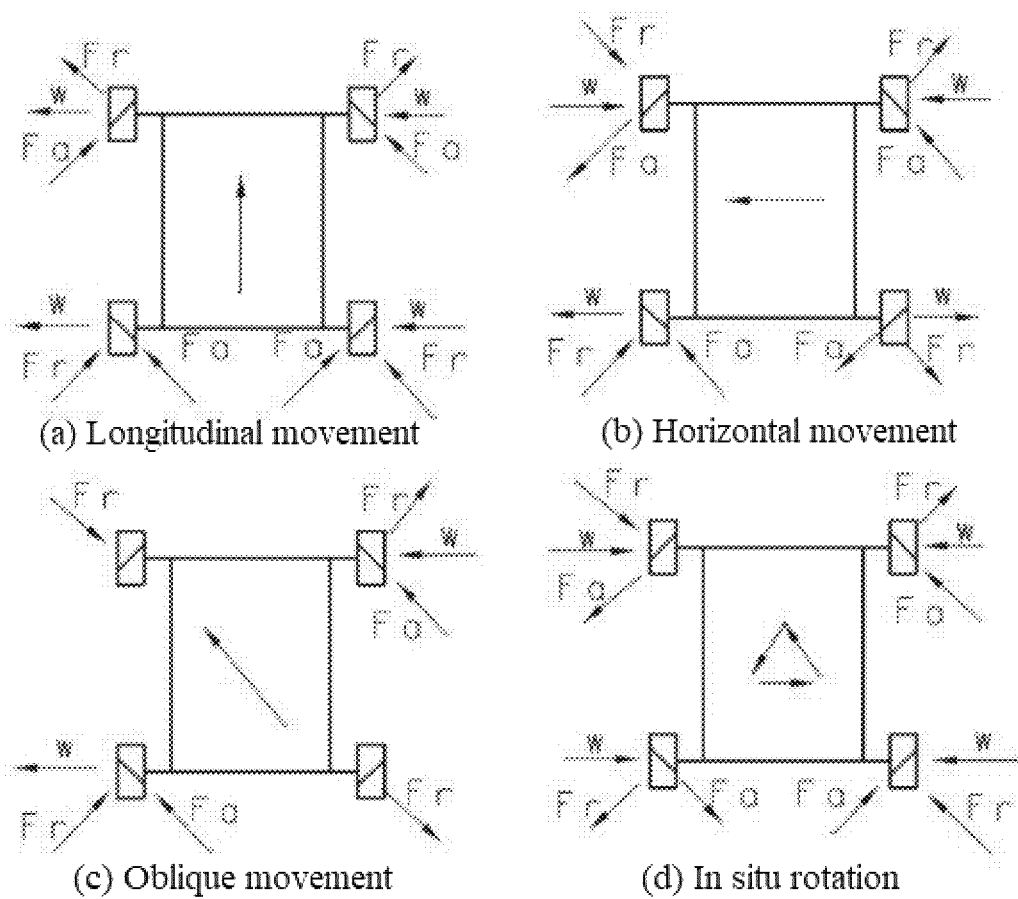
FIG. 4 is a force analysis schematic diagram of a group of mecanum wheels of the present invention during various actions.

An omni-directional electric medical care bed chair shown in FIG. 1 to FIG. 4 includes mecanum wheels (1), rollover prevention wheels (2), a bottom support (3), motors (4), a controller (5), a push rod device (6), a bed chair device (7), a cervical traction device (8), a shoulder joint rehabilitation device (9) and ankle joint rehabilitation devices (10).

In the present embodiment, the bed chair device (7) includes backrest telescopic rods (701), backrest surfaces (702), a backrest connecting rod (703), armrests (704), armrest supporting rods (705), a handle (706), a seat surface connecting piece (707), seat surfaces (708), a seat surface connecting rod (709), a leg surface (710), a leg connecting rod (711) and extrusion locks (712), wherein the backrest telescopic rods (701) comprise a backrest telescopic rod a (701a) and a backrest telescopic rod b (701b), and are hinged to each other, one side of each rod being provided with a convex strip (714) which can be matched with a concave groove (713) in the backrest surfaces (702) and being mounted on the concave groove (713); the backrest surfaces (702) comprise a backrest surface a (702a) and a backrest surface b (702b), are distributed on two sides of the backrest connecting rod (703) and are hinged to the backrest connecting rod (703) hinged to the bottom support (3), respectively, and the concave grooves (713) are provided in the backrest surfaces; a pair of extrusion locks (712) is hinged to the two backrest surfaces (702) separately, and can be in contact with the backrest telescopic rods (701), each contact part is an eccentric circle, friction force between the backrest telescopic rods (701) and the concave grooves (713) can be controlled, when the extrusion locks (712) are screwed, the friction force is increased and the backrest telescopic rods (701) are fixed, and when the extrusion locks (712) are unscrewed, the friction force is decreased and the backrest telescopic rods (701) can slide; there are two armrests (704) and two armrest supporting rods (705), which are distributed on two sides of the bed chair, the armrests (704) are hinged to the backrest surfaces (702), and two ends of the armrest supporting rods (705) are hinged to the corresponding armrests (704) and seat surfaces (708) respectively; the handle (706) is mounted at the front end of one armrest (704), and the handle (706) is connected to the controller (5); the seat surfaces (708) comprise a seat surface a (708a) and a seat surface b (708b), and are hinged to the seat surface connecting rod (709) mounted on the seat surface connecting piece (707), respectively, the seat surface connecting piece (707) being mounted on the bottom support (3); the leg surfaces (710) comprise a leg surface a (710a) and a leg surface b (710b), are distributed on two sides of the leg connecting rod (711) and are hinged to the leg connecting rod (711) hinged to the bottom support (3), respectively, concave grooves (713) are provided in the leg surfaces, and a pair of extrusion locks (712) is hinged to the two leg surfaces (710) separately; and the seat surface a (708a) and the seat surface b (708b) are hinged to the backrest surface a (702a) and the backrest surface b (702b), respectively, and the seat surface a (708a) and the seat surface b (708b) are hinged to the leg surface a (710a) and the leg surface b (710b), respectively.

In the present embodiment, the push rod device (6) includes a backrest push rod connecting piece (601), a backrest push rod (602), a seat surface push rod connecting piece (603), a seat surface push rod (604), a leg push rod (605) and a leg push rod connecting piece (606), wherein two ends of the backrest push rod (602) are hinged to the bottom support (3) and the backrest push rod connecting piece (601) mounted on the backrest connecting rod (703), respectively, the backrest push rod (602) is controlled by the handle (706) through the controller (5), and the backrest push rod (602) drives the backrest connecting rod (703) to move through the backrest push rod connecting piece (601), so that the backrest connecting rod (703) rotates around a hinged part between the backrest connecting rod (703) and the bottom support (3); two ends of the seat surface push rod (604) are hinged to the bottom support (3) and the seat surface push rod connecting piece (603) mounted on the seat surfaces (708), respectively, the seat surface push rod (604) is controlled by the handle (706) through the controller (5), and the seat surface push rod (604) drives the seat surfaces (708) to move through the seat surface push rod connecting piece (603), so that the seat surfaces (708) rotate around the seat surface connecting rod (709); and two ends of the leg push rod (605) are hinged to the bottom support (3) and the leg push rod connecting piece (606) mounted on the leg connecting rod (711), respectively, the leg push rod (605) is controlled by the handle (706) through the controller (5), and the leg push rod (605) drives the leg connecting rod (711) to move through the leg push rod connecting piece (606), so that the leg connecting rod (711) rotates around a hinged part between the leg connecting rod (711) and the bottom support (3).

In the present embodiment, when the seat surface push rod (604) is motionless, the seat surfaces (708) are fixed, the backrest push rod (602) is shortened, the backrest surfaces (702) rotate down until being horizontal, the leg push rod (605) is lengthened, the leg surfaces (710) rotate up until being horizontal, and the seat chair is switched from a state of sitting posture to a state of lying; at this moment, the leg push rod (605) and the backrest push rod (602) are motionless, the leg surfaces (710) and the backrest surfaces (702) are horizontally fixed, the seat surface push rod (604) on one side is lengthened, the seat surface (708) on this side rotates up around the seat surface connecting rod (709), the bed chair is switched from the state of lying to a state of turning over, and the bed chair can be switched to the state of turning over only under the state of lying.

In the present embodiment, two mecanum wheels (1) and motors (4) corresponding to the mecanum wheels (1) are mounted on two sides below the bottom support (3), respectively, the controller (5) is mounted in the middle of the bottom support (3), the motors (4) and the handle (706) are connected to the controller (5), and the motors (4) are controlled to rotate by operating the handle (706), so as to control the motion of the bed chair; and two rollover prevention wheels (2) are mounted below the rear side of the bottom support (3), and can be used for preventing the bed chair from turning back during motion and lying.

In the present embodiment, the cervical traction device (8) is mounted on the backrest connecting rod (703), is used for traction rehabilitation training on the neck of a patient, and is detachable.

In the present embodiment, the shoulder joint rehabilitation device (9) is mounted at the upper part of the rear side of the bottom support (3), is used for rehabilitation training on the shoulder joint of the patient, can be selectively mounted on a corresponding side as required, and is detachable; the shoulder joint rehabilitation device meets a raw of human natural motion, and can achieve various motions such as forward bending, backward extension, outward extension, inward retraction, raising and rotation of the shoulder joint.

In the present embodiment, a pair of ankle joint rehabilitation devices (10) is mounted on the leg surfaces (710) separately, is used for rehabilitation training on the ankle joints of the patient, and is adjustable in height; each ankle joint rehabilitation device (10) adopts four air springs, which ensure that the ankle joint can be fully stretched. Meanwhile, a system is a flexible system, thereby avoiding secondary injury.

While the present invention has been described in some detail for purposes of clarity and understanding, one skilled in the art will appreciate that various changes in form and detail can be made without departing from the true scope of the invention. All figures, tables, appendices, patents, patent applications and publications, referred to above, are hereby incorporated by reference.

What is claimed is:

1. An omni-directional electric medical care bed chair, comprising mecanum wheels (1), rollover prevention wheels (2), a bottom support (3), motors (4), a controller (5), a push rod device (6), a bed chair device (7), a cervical traction device (8), a shoulder joint rehabilitation device (9) and a pair of ankle joint rehabilitation devices (10); wherein one side of a rod-shaped part of each of the pair of ankle joint rehabilitation devices (10) is provided with a convex strip which is matched with one concave groove in leg surfaces (710) and is mounted on the concave groove by means of corresponding lock (712), and the pair of ankle joint rehabilitation devices are used for rehabilitation training on the ankle joints of the patient, and are adjustable in height.

2. The omni-directional electric medical care bed chair of claim 1, characterized in that the bed chair device (7) comprises backrest telescopic rods (701), backrest surfaces (702), a backrest connecting rod (703), armrests (704), armrest supporting rods (705), a handle (706), a seat surface connecting piece (707), seat surfaces (708), a seat surface connecting rod (709), leg surfaces (710), and a leg connecting rod (711); wherein the backrest telescopic rods (701) comprise a backrest telescopic rod a (701a) and a backrest telescopic rod b (701b), and are hinged to each other, with one side of each rod being provided with a convex strip which can be matched with a concave groove in the backrest surfaces (702) and being mounted on the concave groove; wherein the backrest surfaces (702) comprise a backrest surface a (702a) and a backrest surface b (702b), are distributed on two sides of the backrest connecting rod (703) and are hinged to the backrest connecting rod (703) hinged to the bottom support (3) separately; wherein the concave grooves are provided in the backrest surfaces, and a pair of locks (712) is hinged to the two backrest surfaces (702) separately; wherein there are two armrests (704) and two armrest supporting rods (705), which are distributed on two sides of the bed chair, wherein the armrests (704) are hinged to the backrest surfaces (702), and two ends of the armrest supporting rods (705) are hinged to the corresponding armrests (704) and the seat surfaces (708), respectively; wherein the handle (706) is mounted at a front end of one armrest (704), and the handle (706) is connected to the controller (5); wherein the seat surfaces (708) comprise a seat surface a (708a) and a seat surface b (708b), and are hinged to the seat surface connecting rod (709) mounted on the seat surface connecting piece (707) separately, and the seat surface connecting piece (707) being mounted on the bottom support (3); wherein the leg surfaces (710) comprise a leg surface a (710a) and a leg surface b (710b), are distributed on two sides of the leg connecting rod (711) and are hinged to the leg connecting rod (711) hinged to the bottom support (3) separately, wherein concave grooves are provided in the leg surfaces, and a pair of locks (712) is hinged to the two leg surfaces (710) separately; and wherein the seat surface a (708a) and the seat surface b (708b) are hinged to the corresponding backrest surface a (702a) and the corresponding backrest surface b (702b), respectively, and the seat surface a (708a) and the seat surface b (708b) are hinged to the corresponding leg surface a (710a) and the corresponding leg surface b (710b), respectively.

3. The omni-directional electric medical care bed chair of claim 1, characterized in that the push rod device (6) comprises a backrest push rod connecting piece (601), a backrest push rod (602), a seat surface push rod connecting piece (603), a seat surface push rod (604), a leg push rod (605) and a leg push rod connecting piece (606); wherein two ends of the backrest push rod (602) are hinged to the bottom support (3) and the backrest push rod connecting piece (601) mounted on a backrest connecting rod (703), respectively, and the backrest connecting rod (703) is hinged to the bottom support (3); wherein two ends of the seat surface push rod (604) are hinged to the bottom support (3) and the seat surface push rod connecting piece (603) mounted on a seat surface (708), respectively; and wherein two ends of the leg push rod (605) are hinged to the bottom support (3) and the leg push rod connecting piece (606) mounted on the leg connecting rod (711), respectively, and the leg connecting rod (711) is hinged to the bottom support (3).

4. The omni-directional electric medical care bed chair of claim 1, characterized in that two mecanum wheels (1) and motors (4) corresponding to the mecanum wheels (1) are mounted on two sides below the bottom support (3), respectively; wherein the controller (5) is mounted in the middle of the bottom support (3), and the motors (4) are connected to the controller (5); and wherein the rollover prevention wheels (2) are mounted below the rear side of the bottom support (3).

5. The omni-directional electric medical care bed chair of claim 1, characterized in that the cervical traction device (8) is mounted on a backrest connecting rod (703) through bolts, is used for traction rehabilitation training on the neck of a patient, and is detachable.

6. The omni-directional electric medical care bed chair of claim 1, characterized in that the shoulder joint rehabilitation device (9) is mounted at an upper part of the rear side of the bottom support (3) through bolts, is used for rehabilitation training on the shoulder joint of the patient, can be selectively mounted on a corresponding side as required, and is detachable.

* * * * *